March 15, 1938. C. S. MAYFIELD 2,110,997
SOIL CLEANER
Filed March 25, 1936 2 Sheets-Sheet 1
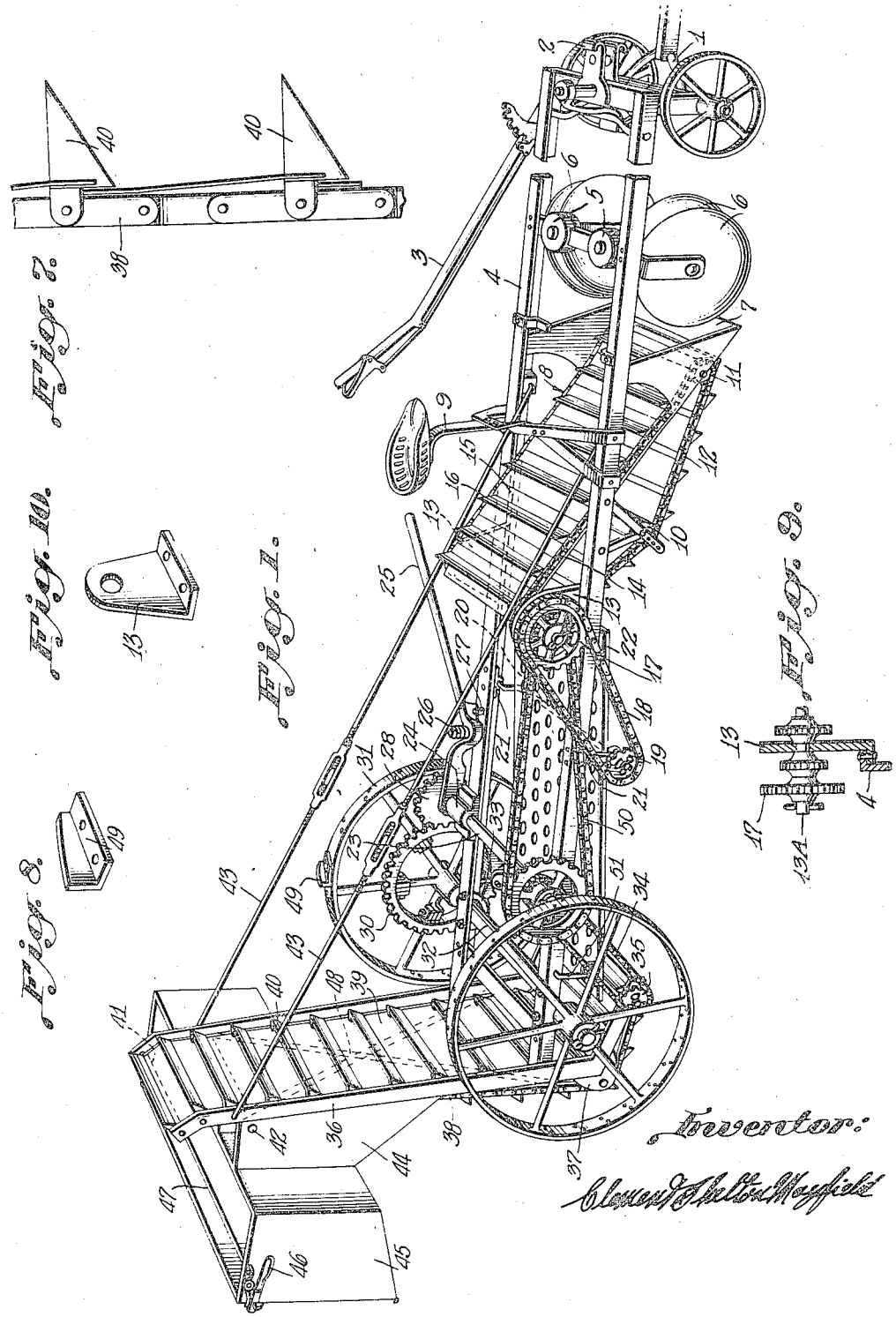
Inventor:
Clement Shelton Mayfield March 15, 1938. C. S. MAYFIELD 2,110,997
SOIL CLEANER
Filed March 25, 1936 2 Sheets-Sheet 2
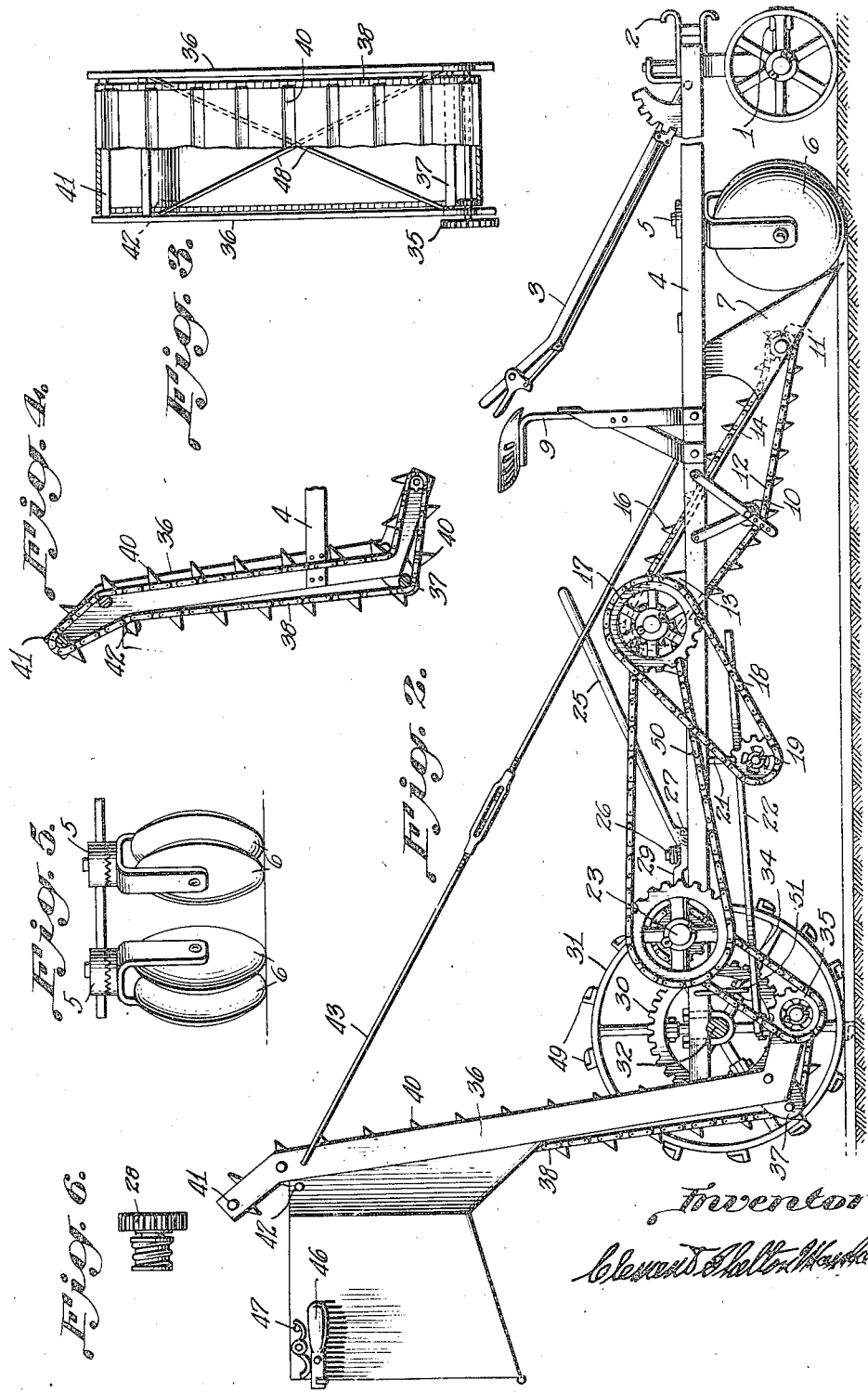

Patented Mar. 15, 1938

2,110,997

UNITED STATES PATENT OFFICE 2,110,997

SOIL CLEANER

Clement Shelton Mayfield, Medina, Tex.

Application March 25, 1936, Serial No. 70,812

1 Claim. (Cl. 97—10)

The invention relates to a farming implement for cleaning the soil; and the object of the invention is to clean the soil (after the land is broken and harrowed) of Johnson grass roots, Bermuda grass, cocklebur seed, rocks and all small trash by scooping the soil up and sifting it.

One form of the invention is illustrated in the accompanying drawings, in which Figure 1 is a view of the machine in perspective; Figure 2, in side elevation and partial section; Figures 3 to 10, inclusive, show details.

The front trucks 1 consist of guide pole, wheels and axle shaft with an upright shaft secured to center of axle shaft projecting up through boxing sleeve in cross bar on front of frame 4.

Hitching plate 2 is secured to front of frame 4, for pull chain or doubletree.

The lever and ratchet 3 are secured to the side of frame 4, with rod attached to top of upright shaft on front trucks controlling the depth of the machine in the soil.

The frame 4 consists of a beam on each side with cross bars on front of frame and over discs 6, and back of rear axle 32.

Discs 6, in multiples of two (four in the present instance) are attached to cross bar on frame 4, and set in position with clamp 5, to turn the soil on to the front of carrier blade 7, and by rolling raise the front of the blade over stumps or large rocks.

The dirt carrier 8, is on a frame attached to a combination hanger plate and carrier blade 7, which is secured to each side of frame 4, and connected (connections not shown) by sheet iron 14, to upright plates 13, (see Fig. 2) with sprocket chains 12, operating from sprocket-wheels on carrier shaft 13A in upright plates 13, and sprocket-wheels 11, (only one shown) with canvas 15, and carrier cups 16, attached to each sprocket chain 12, which is kept tight by adjustable idle-wheels 10, (only one shown) which are on brace arms secured to each side of frame 4.

Operator's seat 9, is secured to each side of frame 4, with brace arms.

Sprocket-wheel 17, (see Fig. 9) operates carrier shaft 13A on upright plates 13, from the small sprocket by sprocket chain 50, to large sprocket-wheel on drive shaft 23.

The large sprocket on sprocket-wheel 17, on carrier shaft 13A on upright plate 13, operates shaker 22, by sprocket chain 18, to sprocket-wheel 19, on shaker shaft 20, which is secured to each side of frame 4, by boxing and bearings 21.

The shaker 22, is attached to shaker shaft 20, by boxing and bearings on bottom of shaker and swinging arms 51, to each side of frame 4, with a changeable bottom which has different size holes for sifting the soil.

The drive shaft 23, is attached to each side of frame 4, by boxing and bearings 24, and operated by sliding gear 28, which slides on square end of shaft 23, and meshes with drive gear 30.

The sliding gear 28, (see Fig. 6) with coil spring and yoke 29, is operated by gear lever 25, to throw the machine in and out of gear.

The gear lever 25, is attached to top of frame 4 by bolt and coil spring 26, and kept in position by pin 27, which is secured to frame 4.

The drive gear 30, which operates the machine is secured to the spokes on drive wheel 31.

The lugs 49, (see Fig. 8) are attached to drive wheel 31 to keep the wheel from sliding in loose soil.

The axle 32, is secured to each side of frame 4 by U bolts 33 (only one shown).

Sprocket chain 34, operates trash conveyer from the inside sprocket of the double sprocket-wheel 17 on drive shaft 23, to sprocket-wheel 35, on conveyer shaft.

The trash conveyer consists of cross braces 48, with side beams 36, secured on each side to the end of frame 4 with tie rods 43, secured to top of beams 36, and attached to frame 4 in front of operator's seat 9, with canvas 39, and carrying cups 40, attached to sprocket chains 38, which operate from sprocket-wheels on conveyer shaft with sprocket-wheel 35, and around roller 41 at top of conveyer, and kept tight and in position by idle-wheels 37 and 42, (partly shown) secured to each side of beams 36.

The dump box 45, is secured to each side of beams 36, with brace plates 44, with door on back of box and hinged on bottom (not shown) letting the door drop down, which serves as a chute to wagon bed.

The latch 46, (only one side shown) fastens the door, and is secured to each end of rod 47, which serves as a tie rod.

I claim:

In a machine for cleaning sod and soil of objectionable material, a vehicle having a frame and means for traveling over said sod, said frame carrying one or more pairs of disks mounted vertically and obliquely with respect to the direction of said traveling, said disks adapted to cut and inwardly throw said sod, a scoop attached to said frame rearward of said disks, an endless carrier with cups rearward of said scoop and mounted on said frame, said scoop adapted to pass beneath said sod and soil and guide same onto said carrier, a shaker mounted on said frame rearward of said carrier and provided with holes, a conveyer with cups rearward of said shaker, driving means for said carrier, shaker and conveyer, said carrier and conveyer extending in direction opposite to said traveling, a dump box rearward of said conveyer, whereby the carrier delivers said soil and sod to said shaker which sifts the soil back to the ground and transfers the objectionable material to the conveyer, which conveyer conveys said material to the dump box.

CLEMENT SHELTON MAYFIELD.